(12) United States Patent
Oisel et al.

(10) Patent No.: US 8,406,609 B2
(45) Date of Patent: Mar. 26, 2013

(54) METHOD FOR GENERATING A SOUND SERIES OF PHOTOGRAPHS AND APPARATUS FOR THE GENERATING AND REPRODUCING SUCH SOUND SERIES

(75) Inventors: Lionel Oisel, La Nouaye (FR); Louis Chevallier, La Meziere (FR); Valerie Allie, Saint Armel (FR)

(73) Assignee: Thomson Licensing, Boulogne-Billancourt (FR)

( * ) Notice: Subject to any disclaimer, the term of this patent is extended or adjusted under 35 U.S.C. 154(b) by 396 days.

(21) Appl. No.: 12/452,202

(22) PCT Filed: Jun. 26, 2008

(86) PCT No.: PCT/EP2008/058123
§ 371 (c)(1),
(2), (4) Date: Jun. 3, 2010

(87) PCT Pub. No.: WO2009/000871
PCT Pub. Date: Dec. 31, 2008

(65) Prior Publication Data
US 2010/0239223 A1     Sep. 23, 2010

(30) Foreign Application Priority Data

Jun. 26, 2007   (FR) ..................... 07 56030

(51) Int. Cl.
*G11B 27/00* (2006.01)
*H04N 5/93* (2006.01)
*H04N 5/931* (2006.01)
*H04N 5/77* (2006.01)
*H04N 9/80* (2006.01)
*H04N 5/932* (2006.01)
*H04N 5/935* (2006.01)

(52) U.S. Cl. ........ 386/280; 386/201; 386/209; 386/210; 386/223; 386/240; 386/241; 386/248; 386/278

(58) Field of Classification Search ................. 386/201, 386/209, 210, 223, 239, 240, 241, 248, 278, 386/280
See application file for complete search history.

(56) References Cited

U.S. PATENT DOCUMENTS

| | | | | |
|---|---|---|---|---|
| 5,812,736 | A * | 9/1998 | Anderson | 386/324 |
| 6,930,703 | B1 | 8/2005 | Hubel et al. | |
| 2006/0028542 | A1 | 2/2006 | Rondinelli et al. | |
| 2006/0245805 | A1* | 11/2006 | Takakuwa et al. | 400/62 |
| 2007/0081796 | A1* | 4/2007 | Fredlund et al. | 386/125 |

FOREIGN PATENT DOCUMENTS

| | | |
|---|---|---|
| WO | WO 98/15119 | 4/1998 |
| WO | WO 00/62542 | 10/2000 |
| WO | WO 2007/038198 | 4/2007 |

OTHER PUBLICATIONS

Search Report Dated Sep. 30, 2009.

* cited by examiner

*Primary Examiner* — Daquan Zhao
(74) *Attorney, Agent, or Firm* — Tutunjian & Bitetto, P.C.

(57) ABSTRACT

The present invention relates to a method for creation of a sound series of photographs. A sound series is produced by a camera and is audible to the user of the device. At various instants of the sound series, the user takes photographs and the device records the instant when the photograph was taken. A table is created associating each photograph with the instant of the sequence when it was taken. The sound sequence terminates then ending the series of photograph takes. Then, the photographs are assembled to form a single panoramic image, a part of the panoramic image is then displayed by an animation. The panoramic image thus created, the sound sequence and the table are assembled to form a panoramic sound image. During the reproduction of the panoramic sound image, each photograph is displayed at the instant associated by the table.

6 Claims, 5 Drawing Sheets

| Photograph index | Associated instant of the sequence |
|---|---|
| Photo 1 | T1 |
| Photo 2 | T2 |
| Photo 3 | T3 |
| Photo 4 | T4 |
| Photo 5 | T5 |

METHOD FOR GENERATING A SOUND SERIES OF PHOTOGRAPHS AND APPARATUS FOR THE GENERATING AND REPRODUCING SUCH SOUND SERIES

This application claims the benefit, under 35 U.S.C. §365 of International Application PCT/EP2008/058123 filed Jun. 26, 2008, which was published in accordance with PCT Article 21(2) on Dec. 31, 2008 in French and which claims the benefit of French patent application Ser. No. 07/56030, filed Jun. 26, 2007.

BACKGROUND

1. Field of the Invention

The invention relates to a method for creating a sound series of photographs from fixed images taken separately, and a device for the implementation of the method.

2. Description of Related Art

In a digital camera, the image in front of the objective is projected onto a CCD or CMOS sensor. The image is then converted into digital data and recorded in a memory. The memory can be definitively incorporated in the device or be removable, it is then presented in the form of a plug-in support. By means of digital technology, the user takes a photograph and is able to see it immediately afterwards on a small screen generally situated on the rear face of the device, the screen is typically an LCD or OLED screen. Using the screen, the user can verify the quality of the photograph that has just been taken, decide to keep it in the memory or to delete it, and can view old photographs for which the data are recorded in the memory. In some devices, the CCD or CMOS sensor is sufficiently rapid to carry out the acquisition of a video sequence of short duration. These devices also have a microphone to capture the sound environment during the recording of the video sequence. During the reproduction of the video sequence, a loud speaker located inside the device enables reproduction of the sound recorded at the same time as the images.

But these video sequences are generally of poor quality, because the capacity for image processing on the fly in a camera does not allow the acquisition of high definition video sequences. Generally, the images of a video sequence realized in a digital camera have a definition of several tens of thousands of pixels.

One solution would be to transfer the processing to another device to produce the audiovisual sequence. The transfer of data is carried out by a connector realizing a link with a computer or any other electronic device such as: television, printer, video projector, etc. The digital data corresponding to the photographs are incorporated in a file that can be transferred to a computer. Once the photograph data are recorded in a memory or downloaded to a computer, software applications enable one or more photographs to be associated with a sound sequence, and thus create an animated audiovisual sequence. To do this, the user manually associates a photograph and a sound sequence. For example, the user dictates a commentary and then associates it with the sequence. When the photography is displayed, the sound sequence is also reproduced. In this way, the display of the photograph is supplemented by the sound content that the user has selected. Specialized editing programs enable the creation of such audiovisual content. Software applications are also known that, from standard format photographs, produce panoramic images from a series of photographs whose edges meet. These programs assemble these photographs together applying a distortion to each so that their edges adjust perfectly. An image is thus obtained covering and angle that can go up to 360°. These images can form horizontal or spherical panoramas.

The document WO 98/15/15119 filed by FLASHPOINT describes a camera that downloads photographs to a computer. The computer displays a menu constituted of thumbnails intended to be selected to display the corresponding images in wide-screen. The user associates a sound with a photo image. A sound sequence is recorded during the period covering the taking of a plurality of photographs. During the reproduction of the sound sequence, an index table enables each photograph to be displayed at the instant of the sound sequence during which it was taken.

The document WO2007/038198 filed by KODAK describes a camera that has a means for recording sound sequences. The device has an operating mode: "stitched panoramic capture mode" illustrated by FIG. 4 enabling more than one photographs to be assembled. Sound sequences are taken for each photograph, and during the reproduction. The sound sequences are reproduced when the user slides the segment of panoramic image to the screen, this segment containing the image associated with the reproduced sequence. A variant consists in that the assembled image is displayed completely on the screen and that the position of an index on the image indicates what sound sequence is selected.

SUMMARY

The present invention enables another type of animation from a plurality of photographs taken during a single sound sequence, and this without intervention of the user at the time of reproduction.

The purpose of the invention is a method for reproducing a panoramic sound image, comprising the following steps:

recording by the camera of a sound sequence such as the ambient sound, of a plurality of photograph shots and steps of recording of said photographs, each photograph being associated with an instant in the sound sequence during which this photograph is acquired.

characterized in that it comprises the following steps:

a step of creation of a single image called "panoramic sound" by assembling a plurality of photographs and by associating said panoramic sound image with the recorded sound sequence, a step for reproducing the panoramic sound image consisting in reproducing the recorded sound sequence and displaying a part of the panoramic image thus created, the panoramic image part corresponding to a photograph being displayed at the instant of the sound sequence when this photograph was acquired.

Thus, the photographs taken are associated with the sound sequence that serves as a time stamp during the reproduction. The photographs taken are displayed during the reproduction of the sound sequence at the same instant of said sequence when the photographs were taken, either at the instant of the recording of this sequence, or at the instant of an initial reproduction. In this way, the sound series of photographs is reproduced with a high level of realism. A single image called "panoramic" is created by assembling the plurality of photographs to produce a graphic continuity between them. The reproduction consists in displaying a part of the panoramic image thus created, the part of the panoramic image corresponding to a photograph being displayed at the instant associated by the table during the reproduction step of the sound sequence. In this way, the parts common to several photographs are deleted and the visual data occupy less space in the sound series of photographs. According to another improvement, during the reproduction, the displayed part of the panoramic image displaces in a continuous movement, the speed of displacement of the part that displays successively each photograph is dependent on the time passing between the taking of two consecutive photographs and the distance separating the two photographs assembled in the panoramic image. In this way, it is possible to create an animation showing a visual window moving within the panoramic image, the display being synchronized by the sound sequence.

According to another improvement, the recording step begins at the introduction of the first command to take a photograph, this first photograph being associated with the beginning of the sound sequence. In this way, an image is displayed from the beginning of the reproduction of the sound sequence. According to another improvement, the recording step terminates at to the end of a determined period without any photographs being taken. In this way, the user no longer has the responsibility of introducing a command to stop the sound sequence, the camera takes responsibility automatically.

According to another improvement, the camera pre-records a sound sequence and reproduces it at the instant when photographs are taken. The table associates each photograph with the instant of the reproduction of the sound sequence during which it was taken. In this way, it is possible to associate a sound other than the ambient sound with a sound series of photographs. According to another improvement, the camera records the sound sequence independently of the taking of the photographs and reproduces the recorded sequence at the instant when the shots were taken. In this way, it is possible to record the ambient sound at a more favorable instant than that when the photographs were taken. According to another improvement, the camera displays a temporal symbol representing the sound sequence being reproduced, the current instant being represented by an index. In this way, the user can see at which instant he is situated in the reproduction of the recorded sound sequence.

The purpose of the invention is also a camera comprising a means for introducing a command to take photographs, and a means for recording a sound sequence such as the ambient sound, characterized in that it comprises a means for creation of a single image called "panoramic sound" assembling the plurality of photographs and associating said panoramic sound image with the recorded sound sequence and a means for producing a table associating each photograph of a plurality of photographs with the instant of the sound sequence during which the photograph was taken, the table enabling each photograph to be displayed at the instant associated by the table during the reproduction of the sound sequence.

Another purpose of the invention is a reproduction device comprising a means for displaying images, a means for reproducing sound and a means for recording an image called "panoramic sound" composed of a sound sequence and an image created by assembling a plurality of photographs, characterized in that the means for recording contain a table associating each photograph of the panoramic sound image with an instant of the recorded sound sequence during which this photograph was taken, the display means displaying a part of the recorded panoramic image and the means for reproducing sound reproducing the sound sequence, such that the part of the panoramic sound image corresponding to a photograph is displayed at the instant of the sound sequence where this photograph was acquired.

BRIEF DESCRIPTION OF THE DRAWINGS

Other characteristics and advantages of the invention will now emerge with more details, within the scope of the description that follows, of embodiments given as an example by referring to the figures attached wherein.

DETAILED DESCRIPTION

Figure 1A:
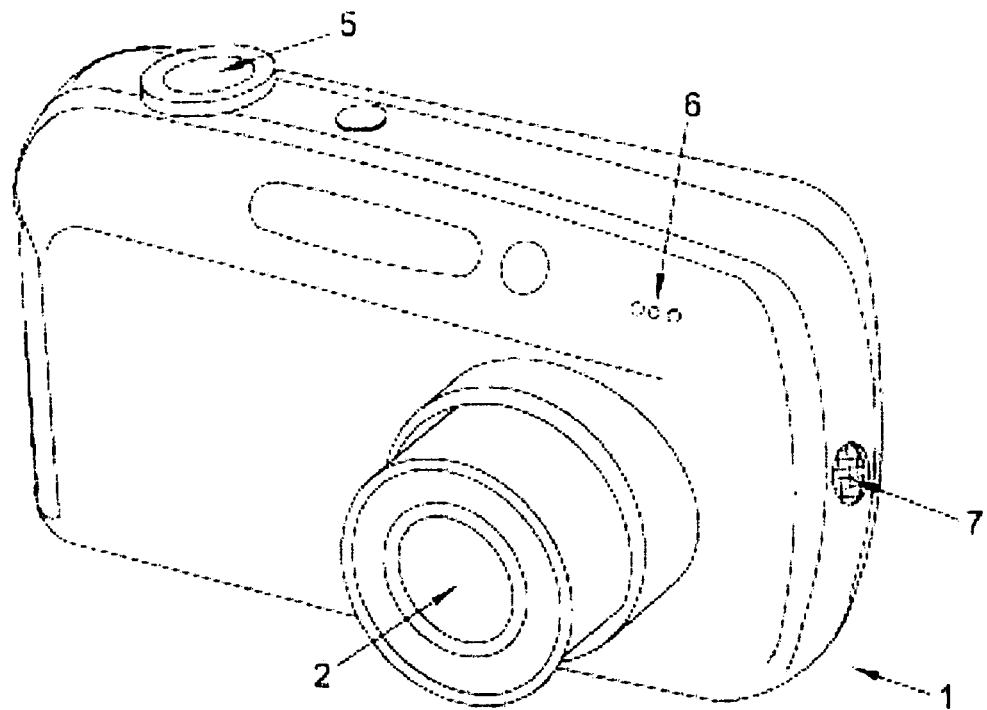
FIGS. 1.a and 1.b represent a front view and a rear view of a camera for the implementation of an embodiment of the invention.
Figure 1B:
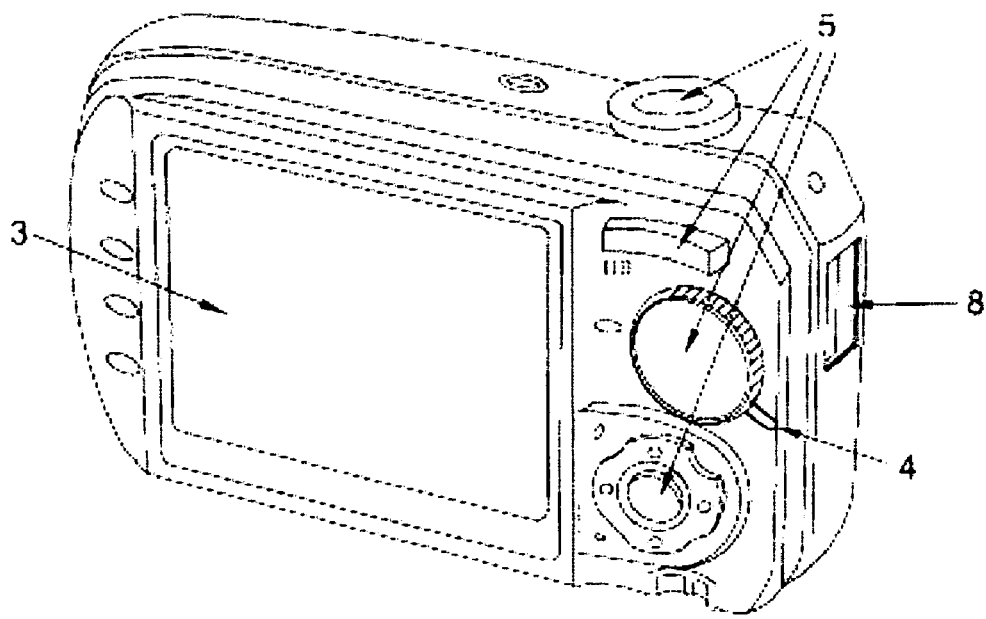

According to a preferred embodiment, the invention is implemented by a digital camera, as presented in the FIGS. 1.a and 1.b. Externally, the digital camera 1 comprises an objective 2, a screen 3 of LCD or OLED technology, a memory module possibly removable 4 and buttons for settings and shooting. The buttons enable the camera 1 to be set to "shooting" mode where the screen 3 visualizes the image detected by the CCD sensors, or in reproduction of recorded contents mode where the images recorded in the memory module 4 are displayed on the screen 3. According to some models, the commands are accessible via icons displayed on the screen. An icon is highlighted and the associated function is executed by pressing the "OK" key. The camera 1 has numerous shooting modes including that enabling recording of a sound series of photographs, called "Sound Series of Photographs" or SSP in abridged form. The recording of the sound environment is carried out using a microphone 6 located on the front face of the camera. It also has a small loudspeaker 7 located on the side. When the user turns his camera to audiovisual content reproduction, the sound sequence is reproduced using the loudspeaker 7.

Optionally the camera comprises a connector 8 that enables transmission of visual and sound contents to a portable computer. For example, the communication is implemented via a USB type link. The photos are recorded in files that are transferred to the computer. The user can thus see his photos on a big screen and listen to the sound contents via loudspeakers connected to the computer.

After having detailed the main components of an example of the device for the implementation of the invention, it will be explained how these components cooperate.

Figures 2, 3:
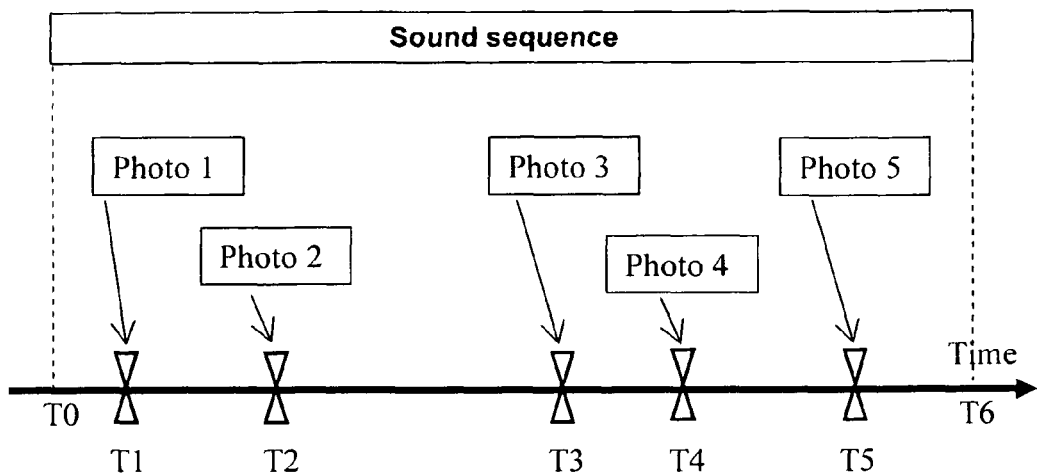
FIG. 2 shows a timing diagram of operations that will eventually enable the production of a sound series of photographs.
FIG. 3 shows an example of a correspondence table between a photograph and the instant when it was taken during the sound sequence.

FIG. 2 shows a timing diagram of operations enabling the production of a sound series of photographs. At the instant T0, the sound sequence is launched, all of the following instants use T0 as the start point. At the instant T1, the user takes a first photograph. In the example illustrated by the figure, the user takes four other photographs at the instants T2, T3, T4 and T5. At the instant T6, the sound sequence ends.

FIG. 3 shows an example of a table of correspondence between photograph identifiers and the instant they were taken. The identifiers "photo 1" to "photo 5" are typically indexes pointing to a certain zone in the memory where the image data are recorded. As previously specified, the instants "T1" to "T5" take the start of the sound sequence as a reference.

Figure 4:
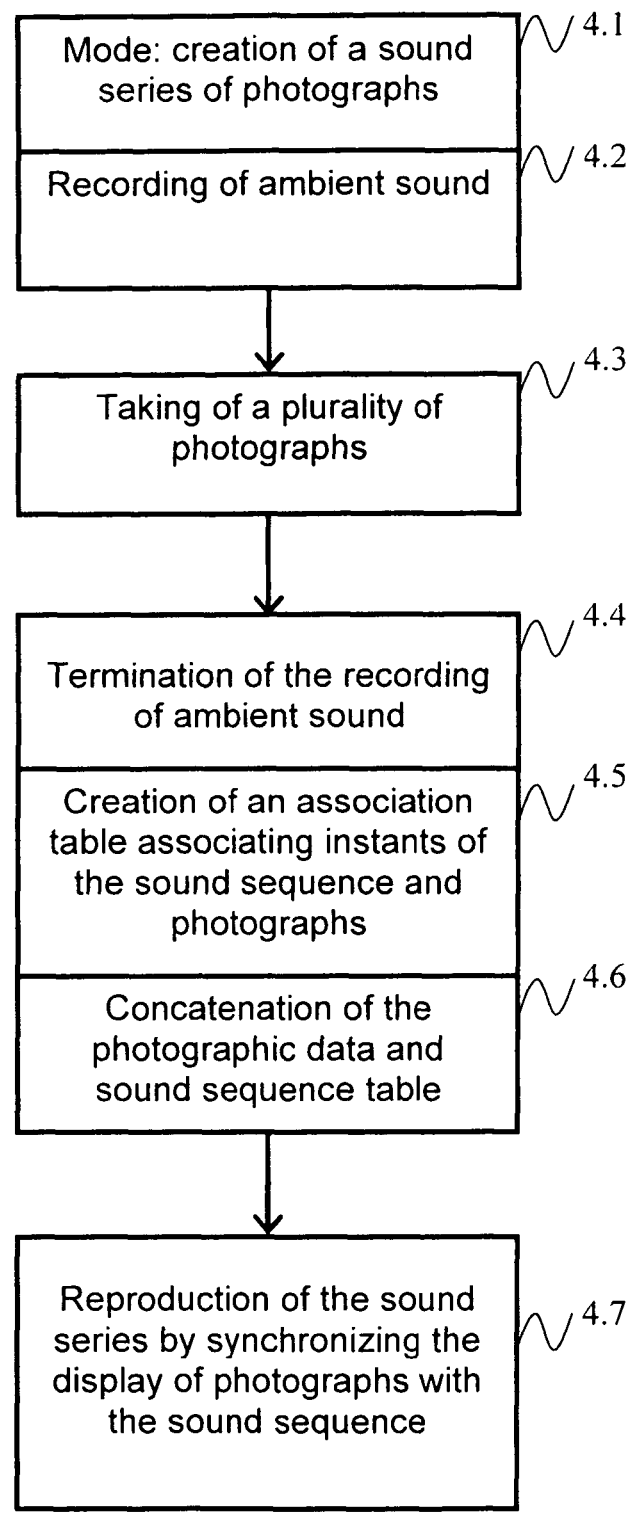
FIG. 4 shows an example of a flow chart of the main steps carried out for the implementation of the method of the invention.

The flow chart of FIG. 4 describes the progression of the main steps for the implementation of the method according to an embodiment of the invention. At step 4.1, the user sets the parameters of his camera in the SSP mode, by using the keys 5 or possibly a menu and an icon for selection. The camera 1 then begins the recording of a sound sequence (step 4.2). The audio signals captured by the microphone 6 are digitalized and recorded in the memory. A variant consists in that the recording of the sequence begins when the user takes the first photograph of the series. In this way, during the reproduction a photograph appears from the first instants. During the recording, the user triggers the taking of a photograph by pressing on the shutter button (step 4.3). At the instant of each press on the shutter button, the camera 1 records the instant of the shot taking as a reference the recorded sound sequence.

At step 4.4, the camera ends the recording of the sound sequence. The end of the recording of the sound sequence is implemented by pressing a specific key, or simply by quitting the SSP mode. According to an improvement, the end of the sound sequence intervenes after a period when no photographs are taken. This period can be programmed using a menu. The period must be greater than the longest time interval between two photographs. A sound signal emitted by the loudspeaker 7 alerts the user of the end of the acquisition of the S.S.P. Then, at step 4.5, the camera 1 produces an association table associating each photograph with the instant of the sound sequence when this photograph was taken. Time stamps specifying a photograph are thus placed on the sound sequence. At step 4.6, the camera 1 assembles the data of the plurality of photographs of the sound sequence in the association table to produce a sound series of photographs. The data constituting the S.S.P. are recorded in a digital format in the form of a file that can be easily transferred.

The file containing a sound sequence of photographs can be reproduced in a device equipped with a display unit and at least one loudspeaker. Advantageously, the camera 1 has a reproduction mode of contents recorded in the memory. If the user requests the reproduction of an S.S.P., the camera reproduces the sound sequence on the loudspeaker 7 while displaying on the screen 3 each photograph with the instant associated by the table. Any other device such as a computer or a decoder equipped with a hard disk can realize the reproduction of an S.S.P.

Assume that the sound series of photographs is reproduced on the camera 1, at step 4.7, the camera reproduces the sound sequence on the loudspeaker 7 and launches a clock. The association table of the sound series is continuously analyzed and as soon as the clock value becomes equal to that of a recorded instant in the association table, the data of the associated photograph are used for the display of the image on the screen 3 (step 4.7). The photographs are advantageously reproduced in the exact order that they were taken. A photograph remains present on the screen until it is erased by the next photograph. The user knows that the reproduction of the S.S.P. has ended when sound is no longer emitted by the loudspeaker 7. According to an improvement, the user can navigate forwards or backwards in the S.S.P. by pressing the keys "→" or "←" and momentarily stop the reproduction by pressing the key "PAUSE". When the reproduction is stopped, the user can delete the photograph displayed by pressing the button "ERASE", the erase command deletes the association in the table.

Figure 5:
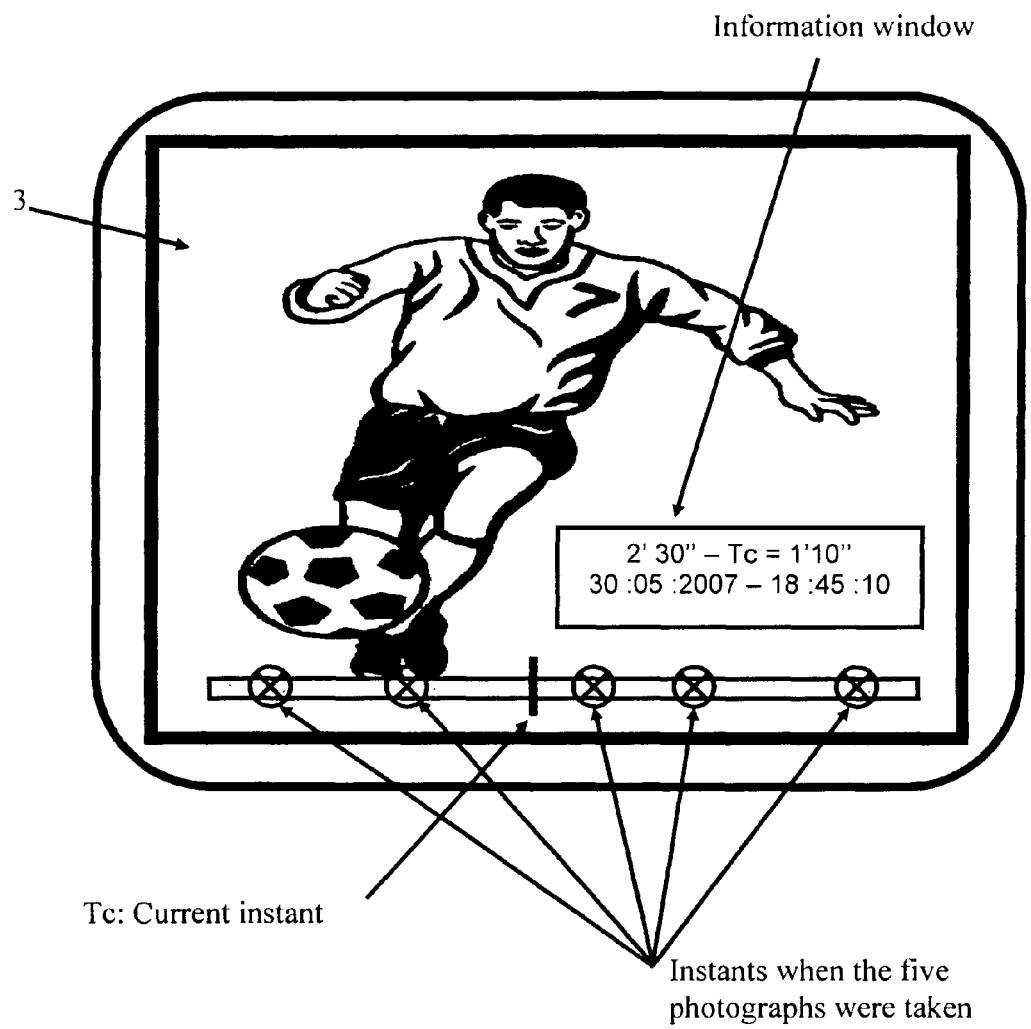
FIG. 5 shows a screen appearance of the camera according to an embodiment of the invention.

According to an improvement illustrated by FIG. 5, the screen displays a temporal symbol of the series by indicating the instants when each photograph of the sound series was taken. Typically, a horizontal line is traced for which the length represents the total duration of the sound sequence. Marks (encircled crosses on FIG. 5) are placed on the line at the instants T0 to Ti when photographs were taken. A distinctive mark represents the current instant, this mark displaces throughout the reproduction of the sound sequence. In this way, the user easily sees at what instant the various photographs of the series will appear. An improvement consists in displaying in a screen window general information on the S.S.P. currently being reproduced, such as:

total duration of the sound series, in minutes and seconds,
value of the current instant, in minutes and seconds,
total number of photographs contained in the series,
time and date of acquisition of the sound sequence.

On the screen illustrated by FIG. 5, a window indicates "2' 30"–Tc=1'10" 30:05:2007–18:45:10" which are respectively the total duration of the sound series, the current instant and the date and time of the start of the recording of the sound sequence.

Assume now that the user is careful to take photographs while conserving a section that is common between one photograph and its successor. To do this, it suffices to position oneself somewhere and take photographs while turning around on the same spot to a maximum angle enabling an overlapping between the photographs. Another way to do it is to be in a vehicle moving along a straight line. It is then possible to produce a panoramic sound image by assembling the photographs one after another in the order in which they were taken, and by associating the image with a sound sequence.

In taking the first two photographs to be assembled, it is important to determine if the second photograph is situated to the left or right of the first. This determination is carried out by analyzing the left and right sides in order to determine a common element. This determination enables the direction of the assembly to be set: if the photographs are added to the left or right of the panoramic image. The assembly is carried out in the following manner. Photograph 1 is taken as the reference image. The first step consists in estimating the deformation to apply to the common zone of the photograph 2 so that it overlaps perfectly on photograph 1. To do this, a method can be used based on points of interest that consists in an extraction of singular points in photograph 1 and photograph 2, followed by a placing in correspondence of these points between the two photographs. From this set of points placed in correspondence, the device producing the panoramic image calculates the deformation model of the common zone. This model is then used to overlap photograph 2 on photograph 1. This process is reiterated for each photograph in order to be assembled in a panoramic image. At the end of this process, a single panoramic image is obtained that is the assembly of photographs on the set of images.

The panoramic image conserves in this data, the partitioning of the photographs. This data defines the parts of the panoramic image that come from each photograph. The partitioning of the photographs can be located due to the correspondence between the zone of each photograph in the panoramic image and the instant where the sound associated with this photograph is heard during the reproduction of the sound sequence. For the zone common to two photographs, it is arbitrarily defined that one half of this zone belongs to one photograph and the other half to the other photograph. Each of these parts is therefore associated with a time stamp that identifies the instant when the shot was taken. At the time of the reproduction of the sound series of photographs, a part of the panoramic image is displayed. This displayed part will displace continuously from one end to the other of the panoramic image. The reproduction of the sound sequence synchronizes the displacement of the part displayed in the panoramic image. The displacement of the displayed part of the panoramic image is carried out in such a way that, when the sound sequence arrives at an instant Ti, the image displayed by the reproduction device is that corresponding to this instant Ti.

Figure 6:
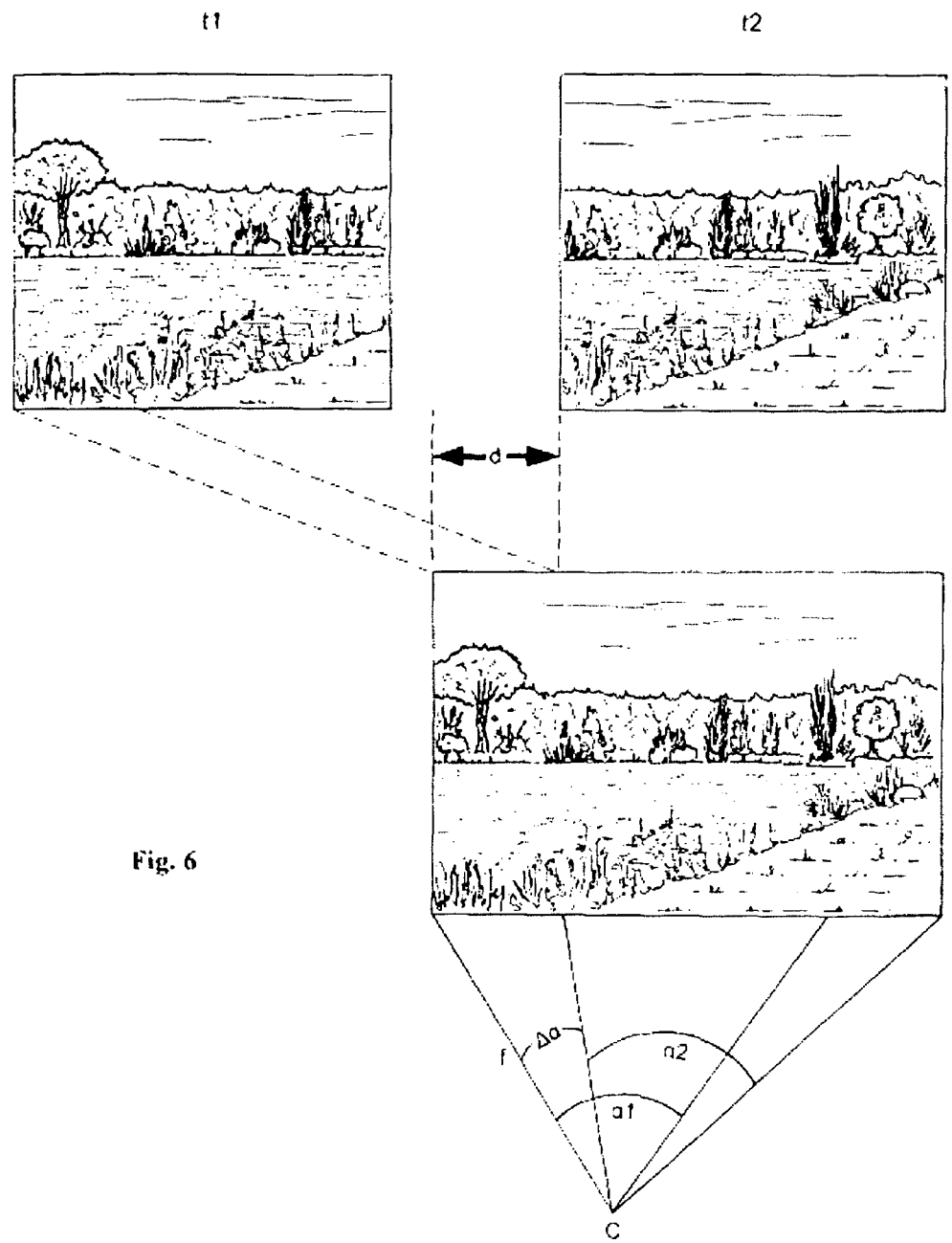
FIG. 6 shows the production of a panoramic image from a plurality of photographs.

The displacement speed of the displayed part depends on the time difference between the two photographs. It is constant between two photographs and varies from one photograph to another. FIG. 6 shows the assembly of two photographs taken at an angle difference of $\Delta\alpha$. The common parts are detected and determine the rotation direction of the camera 1. The resultant panoramic image is the assembly of the part specific to photograph 1, the common part and the part specific to photograph 2.

Knowing the focal length f, the value of the angle associated with the overlapping between the images 1 and 2 can be calculated as well as the time separating the two shots:

$$\begin{cases} \Delta\alpha = 2 * \sin^{-1}\left(\frac{d}{2f}\right) \\ \Delta t = t2 - t1 \end{cases}$$

The video frequency fi according to the virtual angular displacement $d\alpha$ is then given by the equation:

$$fi = \frac{\frac{\Delta\alpha}{d\alpha}}{\Delta t}$$

At this stage there are two display options possible that can be proposed to the user:

Sampling of the mosaic fixed ($d\alpha$ is constant)=>video frequency fi variable Video frequency fixed (fi is constant)=>Sampling $d\alpha$ of the mosaic variable In the first case, the user can decide that the step between two successive photographs of the panoramic image is for example very low in order to avoid artifact phenomena between successive photographs. The video frequency is then calculated in order to satisfy a constant value of $d\alpha$ using the preceding equation.

In the second case, the user can decide that the video frequency is constant (for example at 25 images per second). The $d\alpha$ is then calculated using the equation:

$$d\alpha = \frac{\Delta\alpha}{fi\Delta t}$$

It then remains to generate the virtual images from the fixed $d\alpha$ or calculated according to the embodiment retained.

Once these images have been generated, they are displayed at the fixed or calculated video frequency and synchronized by the sound sequence reproduced at real speed.

In this way, the screen displays a genuine animated sequence as if the user had filmed a panorama while performing a rotation or a continuous translation. The reproduction device scrolls the parts of the panoramic image controlling the scrolling via the soundtrack. The speed will then vary from one photograph to another adding to the diversity and a real appeal to the viewing. A camera is able to film a video sequence but however the definition is between 10 and 100 times less. In producing the assembly of photographs of good definition, the panoramic sequence thus reproduced conserves the same definition, and hence the same quality.

A variant embodiment consists in using a pre-recorded sound sequence rather than the ambient sound captured by the microphone 6. To do this, the camera is connected to a device equipped with a memory containing sound sequences, typically an MP3 player or a computer. The downloading of the sound sequence is carried out via a USB port the connector for which is located on the side of the camera 1. When the user positions his camera in SSP mode, the screen proposes a series of sound sequences while displaying the identifiers on the screen 3. The user selects the sequence for which the reproduction will serve as synchronization for the taking of photographs. By pressing a first time on the shutter button, the reproduction called initial reproduction of the selected sound sequence is produced using the loudspeaker 7. Advantageously, the screen 3 displays the current image in front of the CCD sensor and in superimposition, a temporal symbol representing the selected sound sequence with a mark representing the current instant. In this way, the user sees immediately how much time remains before the end of the selected sound sequence.

The user hears the initial reproduction of the sound sequence and at the opportune instant, takes the photograph by pressing the shutter button. The camera then records the photograph data and the instant of the initial reproduction during which the photograph was taken. An improvement consists in that the user pre-records the sound sequence using the microphone 6 with the ambient sound, this selection will be reproduced at a later time enabling photographs to be taken while synchronizing them. In this way, the user can record a background sound at a favorable moment. For example, the user records a sequence of wave sounds on a deserted beach, and then the user takes photographs when the beach is full of people and the sound of the waves is covered by the speech of the people present.

While the present invention was described in reference to particular illustrated embodiments, said invention is in no way limited to these embodiments, but only by the appended claims. It is noted that any reproduction device able to display an image and reproduce a sound may be applied for the restitution of a sound series of photographs.

The invention claimed is:

1. A method for reproducing a panoramic sound image, comprising the following steps:
    recording by a camera of a sound sequence such as the ambient sound,
    acquiring a plurality of photograph shots and recording of said photographs, each photograph being associated with an instant of the sound sequence during which this photograph is acquired,
    creating a single image called "panoramic sound" by assembling a plurality of photographs and by associating said panoramic sound image with the recorded sound sequence, and
    reproducing the panoramic sound image consisting in reproducing the recorded sound sequence and displaying a part of the panoramic image thus created, the panoramic image part corresponding to a photograph being displayed at the instant of the sound sequence when this photograph was acquired, wherein during said reproducing, the displayed part of the panoramic image displaces in a continuous movement, speed of movement of the image part displaying successively each photograph depends on the time passing between consecutive takes of two photographs and distance separating these photographs in the panoramic image.

2. The method for reproducing a panoramic sound image according to claim 1, wherein the recording begins at the introduction of a first command to take a photograph, this first photograph being associated with the start of the sound sequence.

3. The method for reproducing a panoramic sound image according to claim 1, wherein the recording during which the photographs are taken ends after a determined period without any photographs being taken.

4. The method for reproducing a panoramic sound image according to claim 1, further comprising:
  recording the sound sequence prior to the taking of photographs, and
  reproducing the sound sequence during which the photographs are taken, a table associating each photograph with instant of the reproduction of the sound sequence.

5. The method for reproducing a panoramic sound image according to claim 1, wherein the recording step during which the photographs are taken ends after a determined period without any photographs being taken.

6. A reproduction device comprising
  means for displaying images,
  means for reproducing sound, and
  means for recording an image called "panoramic sound" composed of a sound sequence and an image created by assembling a plurality of photographs,
wherein the means for recording contain a table associating each photograph of the panoramic sound image with an instant of the recorded sound sequence during which this photograph was taken, the display means displaying a part of the recorded panoramic image and the means for reproducing sound reproducing the sound sequence, such that the part of the panoramic sound image corresponding to a photograph is displayed at the instant of the sound sequence where this photograph was acquired,
wherein the image display means reproduces the panoramic sound image displacing the displayed part in a continuous movement, the displacement speed of the part of the panoramic image displaying successively each photograph depends on time passing between consecutive takes of two photographs and distance separating the two photographs in the panoramic image.

\* \* \* \* \*